US010601610B2

(12) United States Patent
Poulin et al.

(10) Patent No.: US 10,601,610 B2
(45) Date of Patent: Mar. 24, 2020

(54) TUNNEL-LEVEL FRAGMENTATION AND REASSEMBLY BASED ON TUNNEL CONTEXT

(71) Applicants: Andre Poulin, Quebec (CA); Michel Rochon, Ottawa (CA); Alp Dibirdi, Andover, MA (US)

(72) Inventors: Andre Poulin, Quebec (CA); Michel Rochon, Ottawa (CA); Alp Dibirdi, Andover, MA (US)

(73) Assignees: Nokia of America Corporation, Murray Hill, NJ (US); Alcatel Lucent, Nozay (FR)

( * ) Notice: Subject to any disclaimer, the term of this patent is extended or adjusted under 35 U.S.C. 154(b) by 108 days.

(21) Appl. No.: 15/480,297

(22) Filed: Apr. 5, 2017

(65) Prior Publication Data
US 2018/0294993 A1 Oct. 11, 2018

(51) Int. Cl.
H04L 12/46 (2006.01)
H04L 12/721 (2013.01)
(Continued)

(52) U.S. Cl.
CPC .......... H04L 12/4633 (2013.01); H04L 45/66 (2013.01); H04L 45/741 (2013.01);
(Continued)

(58) Field of Classification Search
CPC .......... H04L 61/2592; H04L 29/12575; H04L 12/4633; H04L 69/22; H04L 29/0653; H04L 69/166; H04L 29/06136
See application file for complete search history.

(56) References Cited

U.S. PATENT DOCUMENTS

2003/0153296 A1 8/2003 Mueeller
2016/0248670 A1* 8/2016 Gross, IV ............... H04L 45/74

FOREIGN PATENT DOCUMENTS

WO WO 2006/116195 A1 11/2006
WO WO 2008/080717 A1 7/2008

OTHER PUBLICATIONS

3GPP TS 29.281 V14.0.0 (Mar. 2017), 3rd Generation Partnership Project, Technical Specification Group Core Network and Terminals, General Packet Radio System (GPRS) Tunnelling Protocol User Plane (GTPv1-U) (Release 14), Mar. 2017, 29 pages. (Year: 2017).*

(Continued)

Primary Examiner — Hoon J Chung
(74) Attorney, Agent, or Firm — Tong, Rea, Bentley & Kim, LLC

(57) ABSTRACT

This disclosure generally discloses a tunnel-level fragmentation and reassembly capability configured to support tunnel-level fragmentation and reassembly of a packet being transported via a tunnel between a tunnel source node and a tunnel destination node. The tunnel-level fragmentation and reassembly capability may be configured to support tunnel-level fragmentation and reassembly of packets in a manner tending to prevent reassembly errors, that could cause malformed packets or packet drops at the tunnel destination nodes, due to multiple parallel tunnel contexts of the tunnel which may correspond to multiple parallel entry points into the tunnel at the tunnel source node. The tunnel-level fragmentation and reassembly capability may be configured to support tunnel-level fragmentation and reassembly of packets within various types of communication networks, for various types of tunnels, or the like.

26 Claims, 6 Drawing Sheets

(51) Int. Cl.
*H04L 29/06* (2006.01)
*H04L 29/08* (2006.01)
*H04L 12/749* (2013.01)
*H04L 12/911* (2013.01)

(52) U.S. Cl.
CPC .......... *H04L 47/825* (2013.01); *H04L 69/166* (2013.01); *H04L 69/22* (2013.01); *H04L 69/324* (2013.01)

(56) References Cited

OTHER PUBLICATIONS

RFC 791, "Internet Protocol", Darpa Internet Program, Protocol Specification, Sep. 1981, pp. 1-50.
International Search Report and Written Opinion from corresponding PCT Application No. PCT/US2018/025008, dated Jun. 14, 2018, 11 pages.

* cited by examiner

TUNNEL-LEVEL FRAGMENTATION AND REASSEMBLY BASED ON TUNNEL CONTEXT

TECHNICAL FIELD

This disclosure relates generally to communication networks and, more particularly but not exclusively, to supporting tunnel-level fragmentation and reassembly in communication networks.

BACKGROUND

In various types of communication networks, various types of tunnels may be used to transport various types of information between devices. For example, tunnel types commonly used in communication networks may include Generic Routing Encapsulation (GRE) tunnels, Internet Protocol (IP) tunnels, IP Security (IPSec) tunnels, and the like.

SUMMARY

This disclosure generally discloses capabilities configured to support tunnel-level fragmentation and reassembly of a tunnel packet transported via a tunnel.

In at least some embodiments, an apparatus is provided. The apparatus is configured to support tunnel-level fragmentation of a tunnel packet transported via a tunnel. The apparatus includes a processor and a memory communicatively connected to the processor. The processor is configured to generate, by a first node, a tunnel packet to be transported via a tunnel between the first node and a second node. The processor is configured to identify, by the first node, a tunnel context of the tunnel for the tunnel packet. The processor is configured to determine, by the first node, a packet context identifier for the tunnel packet, the packet context identifier including a tunnel context identifier indicative of the tunnel context of the tunnel for the tunnel packet. The processor is configured to send the tunnel packet from the first node toward the second node based on the packet context identifier. In at least some embodiments, a non-transitory computer-readable storage medium stores instructions which, when executed by a computer, cause the computer to perform a corresponding method for supporting tunnel-level fragmentation of a tunnel packet transported via a tunnel. In at least some embodiments, a corresponding method for supporting tunnel-level fragmentation of a tunnel packet transported via a tunnel is provided.

In at least some embodiments, an apparatus is provided. The apparatus is configured to support tunnel-level reassembly of a tunnel packet transported via a tunnel. The apparatus includes a processor and a memory communicatively connected to the processor. The processor is configured to receive, by a first node via a tunnel between the first node and a second node, a set of tunnel fragment packets associated with a tunnel packet to be reassembled at the first node, each of the tunnel fragment packets including a respective tunnel fragment packet header including a packet context identifier for the tunnel packet, the packet context identifier including a tunnel context identifier indicative of a tunnel context of the tunnel packet to be reassembled at the first node. The processor is configured to identify, by the first node based on the packet context identifier included within each of the tunnel fragment packets, the tunnel fragment packets as being associated with the tunnel packet to be reassembled at the first node. The processor is configured to reassemble, by the first node, the tunnel packet based on the tunnel fragment packets. In at least some embodiments, a non-transitory computer-readable storage medium stores instructions which, when executed by a computer, cause the computer to perform a corresponding method for supporting tunnel-level reassembly of a tunnel packet transported via a tunnel. In at least some embodiments, a corresponding method for supporting tunnel-level reassembly of a tunnel packet transported via a tunnel is provided.

In at least some embodiments, a system is provided. The system includes a first node and a second node having established therebetween a tunnel configured to support transport of a tunnel packet from the first node to the second node. The first node is configured to support tunnel-level fragmentation of the tunnel packet based on an indication of a tunnel context of the tunnel for the tunnel packet. The second node is configured to support tunnel-level reassembly of the tunnel packet based on the indication of the tunnel context of the tunnel for the tunnel packet. In at least some embodiments, a node is configured to support tunnel-level fragmentation of a tunnel packet, to be sent from the node toward a second node via a tunnel, based on an indication of a tunnel context of the tunnel for the tunnel packet. In at least some embodiments, a node is configured to support tunnel-level reassembly of a tunnel packet, received by the node from a second node via a tunnel, based on an indication of a tunnel context of the tunnel for the tunnel packet.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
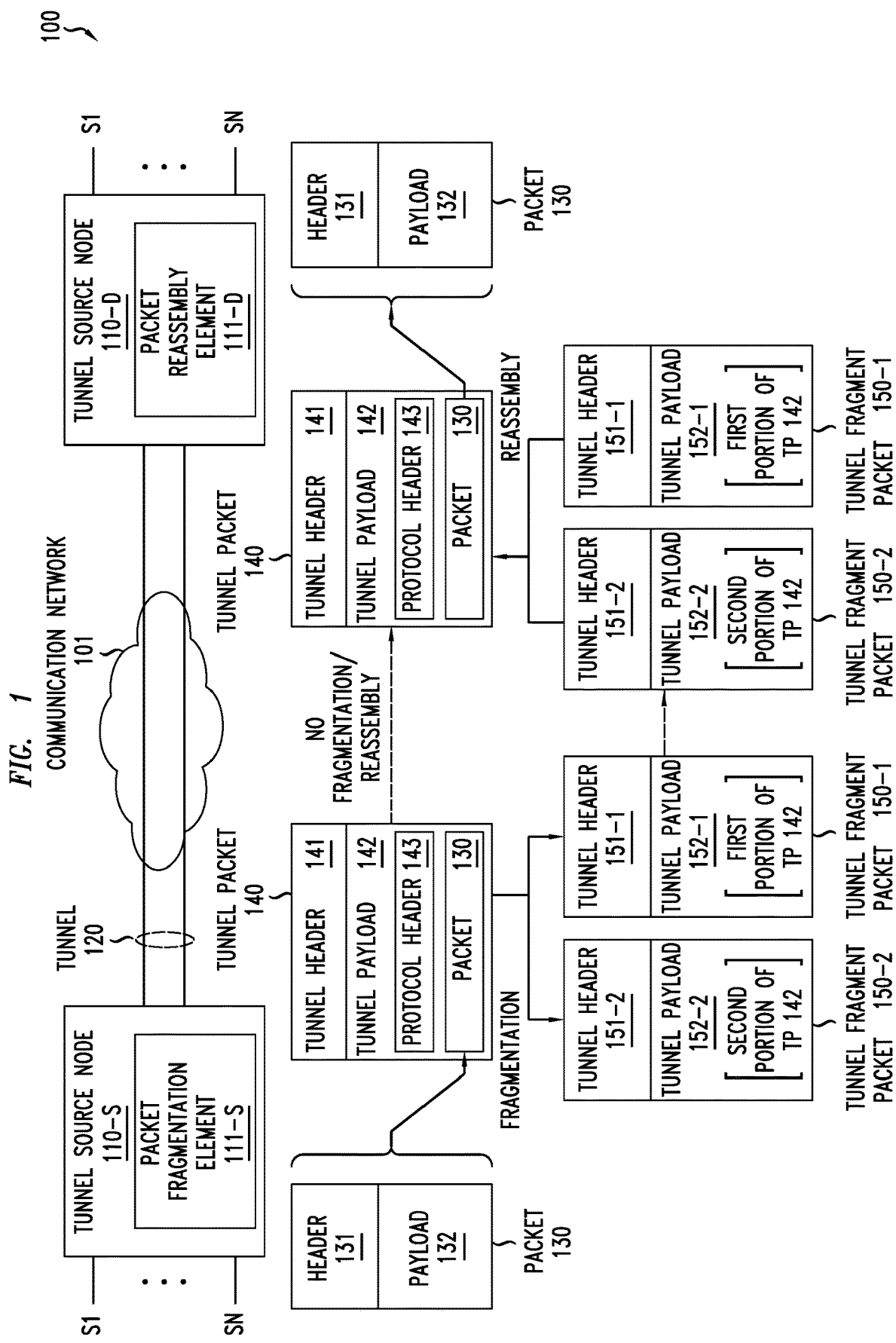
FIG. 1 depicts an example communication system configured to support tunnel-level fragmentation and reassembly on a tunnel between a tunnel source node and a tunnel destination node.

This disclosure generally discloses a tunnel-level fragmentation and reassembly capability configured to support tunnel-level fragmentation and reassembly of a packet being transported via a tunnel between a tunnel source node and a tunnel destination node. The tunnel-level fragmentation and reassembly capability may be configured to support tunnel-level fragmentation and reassembly of packets in a manner tending to prevent reassembly errors, that could cause malformed packets or packet drops at the tunnel destination nodes, due to multiple parallel tunnel contexts of the tunnel which may correspond to multiple parallel entry points into the tunnel at the tunnel source node. The tunnel-level fragmentation and reassembly capability may be configured to support tunnel-level fragmentation and reassembly of a packet that is being transported via a tunnel between a tunnel source node and a tunnel destination node based on unique identification of a packet context for the packet that includes unique identification of the tunnel context for the packet (indicative of a tunnel entry point into the tunnel for the packet at the tunnel source node) and unique identification of the packet within that tunnel context for the packet. The unique identification of the packet context for the packet may be determined at the tunnel source node for use by the tunnel source node in performing tunnel-level fragmentation of the packet and signaled from the tunnel source node to the tunnel destination node for use by the tunnel destination node in performing tunnel-level reassembly of the packet. The unique identification of tunnel entry points into the tunnel at the tunnel source node for packets being transported via the tunnel may be based on various factors such as the architecture of the tunnel source node (e.g., line cards, ports, queues, or the like), use of load balancing techniques (e.g., Link Aggregation Groups (LAGs), Equal-Cost Multi-path (ECMP), or the like), behavior of the underlying communication network, or the like, as well as various combinations thereof. The unique identification of the packet within the tunnel context may be supported in various ways (e.g., using a sequence number, random number, or the like). The unique identification of the packet context for the packet may be signaled from the tunnel source node to the tunnel destination node in various ways (e.g., using various fields which may be transported using various portions of packet headers). The tunnel-level fragmentation and reassembly capability may be configured to support tunnel-level fragmentation and reassembly of packets within various types of communication networks (e.g., wireline networks, wireless networks, low-bandwidth networks, high-bandwidth networks, networks handling both mission critical traffic and lower priority traffic, or the like, as well as various combinations thereof). The tunnel-level fragmentation and reassembly capability may be configured to support tunnel-level fragmentation and reassembly of packets for various types of tunnels, such as for Generic Routing Encapsulation (GRE) tunnels, Internet Protocol (IP) tunnels (e.g., IP version 4 (IPv4) or IP version 6 (IPv6)), IP Security (IPSec) tunnels, or the like. It is noted that these and various other embodiments and advantages or potential advantages of the tunnel-level fragmentation and reassembly capability may be further understood by way of reference to the example communication system of FIG. 1.

FIG. 1 depicts an example communication system configured to support tunnel fragmentation and reassembly.

The communication system 100 includes a communication network (CN) 101 supporting communication between a tunnel source node (TSN) 110-S and a tunnel destination node (TDN) 110-D (which may be referred to collectively herein as tunnel nodes (TNs) 110) having a tunnel 120 established therebetween. It will be appreciated that, although omitted for purposes of clarity, the TSN 110-S and the TDN 110-D may have multiple tunnels running therebetween.

The TNs 110 may include any suitable types of nodes at which tunnel-level fragmentation and reassembly of packets may be supported. The node types of the TNs 110 may depend on various factors, such as whether the TNs 110 are endpoints or intermediate points of the end-to-end data flow, the type of data being transported between the TNs 110, or the like, as well as various combinations thereof. For example, the TNs 110 may include network devices (e.g., access nodes, gateways, routers, switches, or the like), endpoint devices (e.g., user endpoint devices such as smartphones, Internet-of-Things (IoT) related devices, physical host devices, devices hosting virtual hosts, or the like), or the like, as well as various combinations thereof. It is noted that, for purposes of clarity in describing various embodiments, the TNs 110 are presented as being intermediate points in the end-to-end data flow (although, as previously indicated, either or both of the TNs 110 may be endpoints of the end-to-end data flow).

The tunnel 120 may include any suitable type of tunnel for which tunnel-level fragmentation and reassembly of packets may be supported. For example, the tunnel 120 may be a GRE tunnel, an IP tunnel, an IPSec tunnel, or the like. The tunnel 120 may traverse various underlying communication networks, which may depend on various aspects of the TNs 110 (e.g., device types of the TNs 110, locations of the TNs 110, whether the TNs 110 are endpoints or intermediate points of the end-to-end data flow, or the like, as well as various combinations thereof). The tunnel 120 may traverse various underlying communication networks which may include various device types (e.g., routers, switches, gateways, or the like, as well as various combinations thereof). These underlying communication networks are represented in FIG. 1 as communication network 101.

The tunnel 120 may support a set of multiple parallel tunnel contexts via which data may be transported via the tunnel 120, which may correspond to multiple parallel tunnel entry points into the tunnel 120 at TSN 110-S. The multiple parallel tunnel contexts may be based on various factors, such as architectural aspects of the TSN 110-S (e.g., number of line cards used, number of ports per line card used, number and arrangements of queues (e.g., per line card, per port, independent of port, independent of line card, or the like), or the like), use of quality-of-service (QoS) mechanisms at the TSN 110-S (e.g., use of forwarding class queues, use of per port queuing, use of per network interface queuing (e.g., using a VLAN shaper), or the like), use of load balancing mechanisms at the TSN 110-S (e.g., LAG, ECMP, or the like), network topology of the underlying network supporting the tunnel 120, or the like, as well as various combinations thereof. The impacts of such factors in creating the multiple parallel tunnel contexts are discussed further below.

Figure 2:
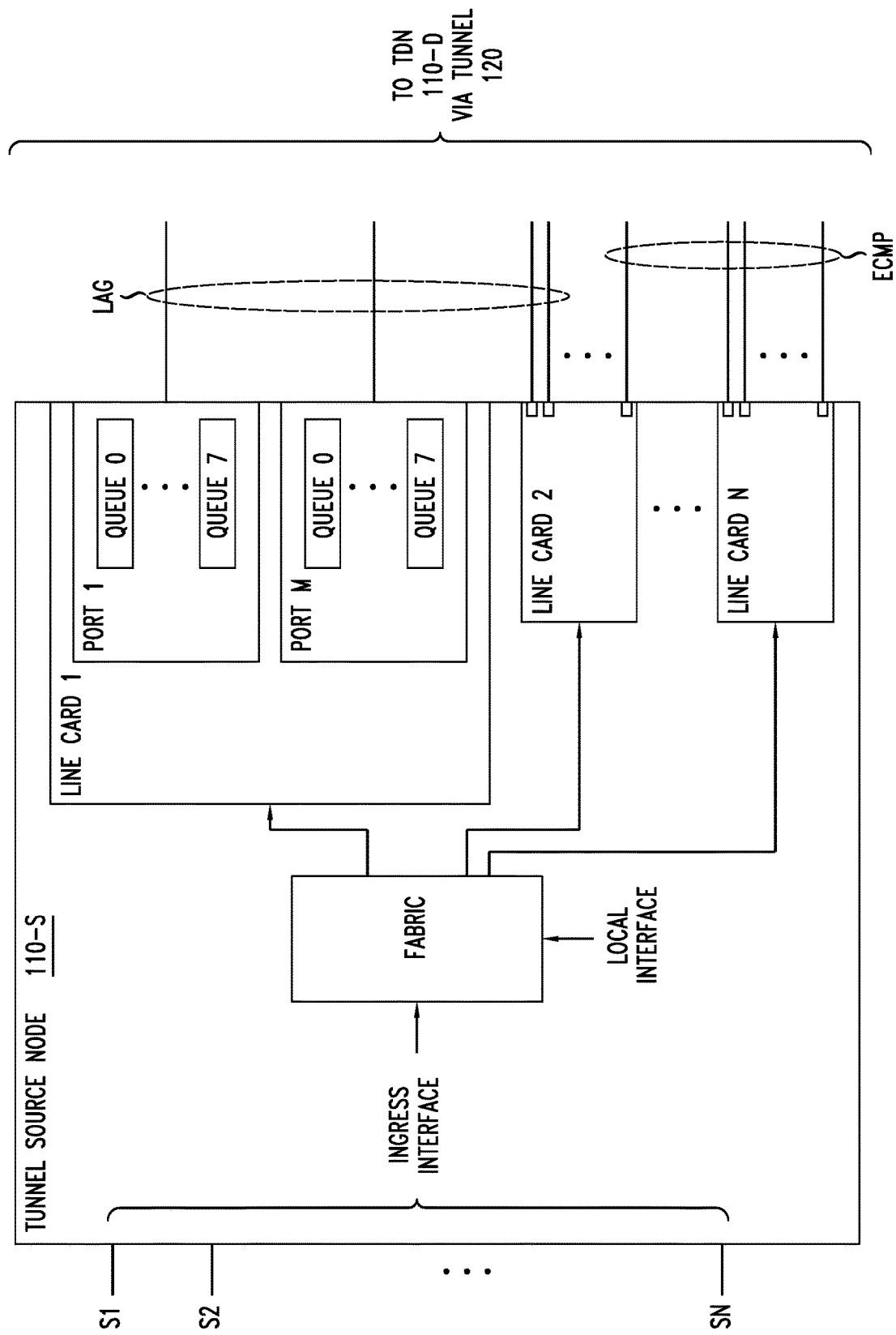
FIG. 2 depicts an example of a tunnel source node for illustrating various tunnel contexts which may be used as a basis for tunnel-level fragmentation and reassembly on a tunnel between the tunnel source node and a tunnel destination node.

The tunnel 120 may support multiple parallel tunnel contexts which, as noted above, may be based on various factors. For example, without use of a load balancing method for the tunnel 120, the tunnel 120 may exit the TSN 110-S on a single line card, on a single interface, and, thus, in a single set of egress network queues (e.g., per port queues, per VLAN shaper queues, or the like) and out a single port. For example, with use of a load balancing mechanism (e.g., LAG, ECMP, or the like), the tunnel 120 may exit the TSN 110-S on a single line card or multiple line cards and, thus, exit the TSN 110-S on one or more network interfaces and one or more ports. With use of LAG on a single line card, the tunnel 120 may exit the TSN 110-S on multiple ports for the same network interface and, thus, on different sets of egress network queues (e.g., per port queues, per VLAN shaper queues, or the like). With use of ECMP on a single line card, the tunnel 120 may exit the TSN 110-S on multiple interfaces which could result in (1) the tunnel 120 exiting the TSN 110-S on different ports and, thus, on different sets of egress network queues (e.g., per port queues, per VLAN shaper queues, or the like) or (2) the tunnel 120 exiting the TSN 110-S on the same port, which could mean that different interfaces are sharing the same set of egress network queues when no per VLAN shaper are configured or could mean different set of egress network queues if per VLAN shaping is enabled on those interfaces. The multiple parallel tunnel contexts of the tunnel 120, as noted above, also may be based on network topology (e.g., if a network provider uses class-of-service (CoS) forwarding, datagrams from different classes of service may take different next-hops on a router downstream of the TSN 110-S even though these datagrams may have come from the same egress network queue on the TSN 110-S, creating additional parallel tunnel contexts that the TDN 110-D needs to be able to uniquely identify and reassemble). The multiple parallel tunnel contexts which may be created or supported for the tunnel 120 may be further understood by way of reference to FIG. 2, which illustrates an example implementation of TSN 110-S in which the TSN 110-S includes multiple line cards with each line card having multiple ports and with each port supporting multiple queues, and in which load balancing using both LAG and ECMP are being used. The multiple parallel tunnel contexts associated with the tunnel 120, such as those illustrated in FIG. 2 as well as others as discussed above, may present various challenges to uniquely identifying tunnel entry points when performing tunnel-level fragmentation and reassembly of packets transported via the tunnel 120.

The TNs 110 are configured to support transport of data via tunnel 120. The data that is transported via the tunnel 120 may include bearer traffic (e.g., services, flows or the like), control traffic, or the like, as well as various combinations thereof. The data that is transported via the tunnel 120 may include data that enters TSN 110-S and exits TDN 110-D (illustrated in FIG. 1 as a set of services S1-SN which enter an ingress side of TSN 110-S and exit an egress side of TDN 110-D), data originating at the TSN 110-S and which may terminate at the TDN 110-D or be propagated beyond TDN 110-D (omitted for purposes of clarity), or the like, as well as various combinations thereof. The data that is transported via the tunnel 120 may include data being transported using various underlying communication services, such as circuit emulation (CE) services, Ethernet pseudowire (PW) services, Layer 2 (L2) virtual private networking (VPN) services, Layer 3 (L3) VPN services, Internet Protocol (IP) services, or the like, as well as various combinations thereof. The data to be transported via the tunnel is in the form of packets, which is represented in FIG. 1 as a packet 130 having a header 131 and payload 132 (e.g., either or both of which may have formats that may vary depending on various factors, such as the type of data being transported, the protocol(s) being used, or the like, as well as various combinations thereof). The data that is transported via the tunnel 120 may be transported using the various tunnel contexts of the tunnel 120 and the manner in which the data is transported using the various tunnel contexts of the tunnel 120 may depend on various factors (e.g., characteristics of the packet 130 being transported, characteristics of the tunnel 120, characteristics of the tunnel contexts of the tunnel 120, or the like, as well as various combinations thereof).

The TNs 110 are configured to support transport of data via tunnel 120 in the form of tunnel packets, which are represented as a tunnel packet 140 having a tunnel header 141 (which also may be referred to herein as a tunnel packet header 141) and a tunnel payload 142 (which also may be referred to herein as a tunnel packet payload 142).

The tunnel header 141 is configured to support tunneling of the tunnel packet 140 via the tunnel 120. The tunnel header 141 includes tunnel information identifying the tunnel 120. For example, the tunnel header 141 may include tunnel information such as a source address of the tunnel 120 (e.g., identifying the source of the tunnel 120 for the tunnel packet 140, namely, TSN 110-S), a destination address of the tunnel 120 (e.g., identifying the destination of the tunnel 120 for the tunnel packet 140, namely, TDN 110-D), and a protocol of the tunnel 120 (e.g., GRE, IP, IPSec, or the like). The tunnel header 141 also may include additional information, at least some of which may depend on whether the tunnel packet 140 is to be fragmented and reassembled. The format and content of the tunnel header 141 may depend on the tunnel type of the tunnel 120 (e.g., GRE, IP, IPSec, or the like).

The tunnel payload 142 is configured to support transport of data (and, optionally, other information such as additional header information) via the tunnel 120. The tunnel payload 142 includes the packet 130. The tunnel payload 142 also may include additional header information (e.g., protocol header 143), which may vary for different tunnel types of tunnel 120. For example, where tunnel 120 is a GRE tunnel, the protocol header 143 may include a GRE header and MPLS service labels (e.g., for identifying which of the services S is transported in the packet 130 being tunneled). For example, when tunnel 120 is an IP tunnel, the protocol header 143 may include MPLS service labels (e.g., for identifying which of the services S is transported in the packet 130 being tunneled). For example, when tunnel 120 is an IPSec tunnel, the protocol header 143 may include the encryption header (e.g., the Encapsulating Security Payload (ESP) or the like).

The TNs 110 are configured to support transport of data via tunnel 120 in the form of tunnel packets, such as the tunnel packet 140 having the tunnel header 141 and the tunnel payload 142. In general, the tunnel payload 142 is formed at the TSN 110-S (e.g., by placing the packet 130 and, optionally, additional header information into the tunnel payload 142) and terminated at the TDN 110-D (e.g., by extracting the packet 130 and, when present, the additional header information from the tunnel payload 142). In general, the tunnel header 141 is added to the tunnel payload 142 by the TSN 110-S to form the tunnel packet 140 for transporting the packet 130 and removed from the tunnel payload 142 by the TDN 110-D to terminate the tunnel packet 140 for recovering the packet 130. The TNs 110 may be configured to support various other functions related to use of tunneling packet to tunnel packet 130 via the tunnel 120.

The TNs 110 are configured to support transport of packets via the tunnel 120 without fragmenting and reassembling the packets or using tunnel-level fragmentation and reassembly of the packets.

The TNs 110 are configured to support transport of packets via the tunnel 120 without fragmenting and reassembling the packets. In this case, the tunnel packet 140 is sent over the tunnel 120 without using fragmentation or reassembly.

The TSN 110-S is configured to support tunnel-level fragmentation of tunnel packets (e.g., tunnel packet 140) being transported via the tunnel 120 and the TDN 110-D is configured to support tunnel-level reassembly of tunnel packets (again, e.g., tunnel packet 140) being transported via the tunnel 120. In this case, the tunnel packet 140 is fragmented at the TSN 110-S at the tunnel level and reassembled at the TDN 110-D at the tunnel level. As depicted in FIG. 1, where fragmentation and reassembly are performed on the tunnel packet 140 at the tunnel level, the tunnel packet 140 is transported via the tunnel 120 using two tunnel fragment packets 150, which are represented as a first tunnel fragment packet 150-1 having a tunnel header 151-1 and a tunnel payload 152-1 and a second tunnel fragment packet 150-2 having a tunnel header 151-2 and a tunnel payload 152-2. The tunnel headers 151-1 and 151-2 also may be referred to herein as tunnel headers 151 or tunnel fragment packet headers 151. The tunnel payloads 152-1 and 152-2 also may be referred to herein as tunnel payloads 152 or tunnel fragment packet payloads 152.

The tunnel headers 151 of the tunnel fragment packets 150 are configured to support tunneling of the tunnel fragment packets 150 (and, thus, tunnel packet 140) via the tunnel 120. The tunnel headers 151 of the tunnel fragment packets 150 each include tunnel information identifying the tunnel 120. For example, the tunnel headers 151 of the tunnel fragment packets 150 each may include tunnel information such as a source address of the tunnel 120 (e.g., identifying the source of the tunnel 120 for the tunnel packet 140, namely, TSN 110-S), a destination address of the tunnel 120 (e.g., identifying the destination of the tunnel 120 for the tunnel packet 140, namely, TDN 110-D), and a protocol of the tunnel 120 (e.g., GRE, IP, IPSec, or the like). The format and content of the tunnel headers 151, like the tunnel header 141, may depend on the tunnel type of the tunnel 120 (e.g., GRE, IP, IPSec, or the like). The tunnel headers 151 of the tunnel fragment packets 150 each include reassembly context information (e.g., the tunnel information as well as additional context information) which may be used to support reassembly of the tunnel packet 140 at the TDN 110-D.

The tunnel payloads 152 of the tunnel fragment packets 150 are configured to transport the tunnel payload 142 of the tunnel packet 140 that is being fragmented and reassembled. The tunnel payloads 152-1 and 152-2 include respective portions (or fragments) of the tunnel payload 142 of the tunnel packet 140 (and, thus, of the packet 130 being transported via the tunnel packet 140). For example, the tunnel payload 152-1 may include a portion of the tunnel payload 142 and the tunnel payload 152-2 may include a remaining portion of the tunnel payload 142.

The TNs 110 are configured to support transport of data via tunnel 120 in the form of fragmented tunnel packets, such as the fragmented tunnel packets 150 having the tunnel headers 151 and the tunnel payloads 152. In general, the tunnel payloads 152 are formed at the TSN 110-S (e.g., by fragmenting the tunnel payload 142 of the tunnel packet 140) and terminated at the TDN 110-D (e.g., by combining the tunnel payloads 152 to reassemble the tunnel packet 140). In general, the tunnel headers 151 are added to the respective tunnel payloads 152 by the TSN 110-S to form the tunnel fragment packets 150 for transporting the tunnel packet 140 and removed from the respective tunnel payloads 152 by the TDN 110-D to terminate the tunnel fragment packets 150 for recovering the tunnel packet 140. The TNs 110 may be configured to support various other functions related to use of fragmentation and reassembly to transport data via the tunnel 120.

The TNs 110 are configured to support transport of packets via the tunnel 120 using tunnel-level fragmentation and reassembly of the packets. The TSN 110-S fragments the tunnel packet 140 to form the tunnel fragment packets 150 and the TDN 110-D reassembles the tunnel packet 140 from the tunnel fragment packets 150. It will be appreciated that the fragmentation and reassembly of packets on the tunnel 120 may be due to various factors, such as maximum transmission unit (MTU) size or the like. It will be appreciated that, although presented with respect to two tunnel fragment packets, any suitable number of tunnel fragment packets may be created (e.g., for a packet with 1200 bytes and an MTU size of 512 bytes, the packet may be fragmented into three tunnel fragment packets).

The TNs 110 are configured to support tunnel-level fragmentation and reassembly of packets being transported via the tunnel 120 based on a reassembly context that is determined by the TSN 110-S, signaled from the TSN 110-S to the TDN 110-D (e.g., within the tunnel headers 151 of the tunnel fragment packets 150), and used by the TDN 110-D for reassembly of the tunnel packet 140. The reassembly context may be represented using a reassembly tuple, which is included in each of the tunnel headers 151 of each of the tunnel fragment packets 150 by the TSN 110-S when fragmenting the tunnel packet 140 and which are accessed by the TDN 110-D from each of the tunnel headers 151 of each of the tunnel fragment packets 150 when reassembling the tunnel packet 140 from the tunnel payloads 152 of the tunnel fragment packets 150. The reassembly tuple may include a combination of a source address (e.g., identifying the source of the tunnel 120 for the tunnel packet 140, namely, TSN 110-S), a destination address (e.g., identifying the destination of the tunnel 120 for the tunnel packet 140, namely, TDN 110-D), a protocol (e.g., identifying the protocol of the tunnel 120 and, thus, of the tunnel packet 140, such as GRE, IP, IPSec, or the like), and a packet context identifier for the tunnel packet 140 that is configured to uniquely identify the tunnel packet 140 that is being fragmented and reassembled. The packet context identifier for the tunnel packet 140 is configured to uniquely identify the tunnel packet 140 that is being fragmented and reassembled based on (1) a tunnel context identifier providing unique identification of the tunnel context of the tunnel packet 140 (and, thus, the tunnel context via which the packet 130 is transported) and (2) a packet identifier providing unique identification of the tunnel packet 140 within the tunnel context of the tunnel packet 140 (and, again, within the tunnel context via which the packet 130 is transported). In this manner, TNs 110 are configured to support tunnel-level fragmentation and reassembly of packets being transported via tunnel 120 in a manner that accounts for the multiple parallel tunnel contexts of the tunnel 120, based on unique identification of the multiple parallel tunnel contexts of the tunnel 120, thereby preventing reassembly errors (which may result in malformed packets or packet drops at the TDN 110-D) that might otherwise result from failure to perform packet fragmentation and reassembly in a manner that accounts for the multiple parallel tunnel contexts of the tunnel 120.

The TNs 110 are configured to support tunnel-level fragmentation and reassembly of packets being transported via tunnel 120, in a manner that accounts for the multiple parallel tunnel contexts of the tunnel 120, based on unique identification of the multiple parallel tunnel contexts of the tunnel 120. This unique identification is communicated using the tunnel context identifier of the packet context identifier, as discussed above. The unique identification of the multiple parallel tunnel contexts of the tunnel 120 may depend on the elements or factors that cause the multiple parallel tunnel contexts of the tunnel 120 (e.g., as presented with respect to FIG. 2). The unique identification of the multiple parallel tunnel contexts of the tunnel 120 may be based on unique identification of various combinations of architectural elements of the TSN 110-S (e.g., unique identification of one or more of line cards, ports, queues, network interfaces, or other elements of the TSN 110-S), where such combinations of architectural elements of the TSN 110-S to be uniquely identified for the tunnel 120 may be based on the combination of the elements or factors that cause the multiple parallel tunnel contexts of the tunnel 120. In other words, given that the multiple parallel tunnel contexts of the tunnel 120 may be caused by various combinations of architectural elements of the TSN 110-S (e.g., arrangements and use of one or more of line cards, ports, queues, network interfaces, or other elements of the TSN 110-S), the unique identification of the multiple parallel tunnel contexts of the tunnel 120 may be based on unique identification of various combinations of architectural elements of the TSN 110-S (e.g., unique identification of one or more of line cards, ports, queues, network interfaces, or other elements of the TSN 110-S). The unique identification of architectural elements of the TSN 110-S (e.g., numbers and arrangements of bits used for identification) may be based on various factors (e.g., numbers and types of architectural elements of the TSN 110-S to be uniquely identified). The operation of the TNs 110 in using unique identification of multiple parallel tunnel contexts of the tunnel 120 to support tunnel-level fragmentation and reassembly of packets transported via tunnel 120 may be further understood with respect to the following examples.

In at least some embodiments, for example, unique identification of the multiple parallel tunnel contexts of tunnel 120 may be based on a tunnel context identifier that includes a set of bits identifying a line card of the TSN 110-S, a set of bits identifying a port of the TSN 110-S, a set of bits identifying a queue of the TSN 110-S, and a set of bits identifying a network interface of the TSN 110-S. For example, the tunnel context identifier may be a 20-bit context identifier that includes 4 bits for identifying the line card number, 4 bits for identifying the port number, 4 bits for identifying the queue (e.g., for 7 data queues and 1 control queue), and 8 bits for identifying the network interface identifier (e.g., due to a per-VLAN shaper). For example, the tunnel context identifier may be an 18-bit context identifier that includes 4 bits for identifying the line card number, 4 bits for identifying the port number, 4 bits for identifying the queue (e.g., for 7 data queues and 1 control queue), and 6 bits for identifying the VLAN shaper identifier. It will be appreciated that the tunnel context identifier may utilize other numbers and arrangements of identifier elements, identifiers defined based on identifier elements using other numbers of bits, or the like, as well as various combinations thereof. It is noted that such tunnel context identifiers may be used under various conditions, such as where load balancing mechanisms (e.g., LAG, ECMP, or the like) are or may be applied on the tunnel 120.

In at least some embodiments, for example, unique identification of the multiple parallel tunnel contexts of tunnel 120 may be based on a tunnel context identifier that includes a set of bits identifying a queue of the TSN 110-S. For example, the tunnel context identifier may be an 8-bit tunnel context identifier that includes 8 bits for identifying the queue. For example, the tunnel context identifier may be a 4-bit context identifier that includes 4 bits for identifying the queue. It will be appreciated that the tunnel context identifier may utilize other numbers and arrangements of identifier elements, identifiers defined based on identifier elements using other numbers of bits, or the like, as well as various combinations thereof. It is noted that such tunnel context identifiers may be used under various conditions, such as where load balancing mechanisms (e.g., LAG, ECMP, or the like) are not being used and per-VLAN shapers are not being used.

It will be appreciated that the foregoing examples are merely a few of the various ways in which tunnel context identifiers may be defined for uniquely identifying multiple parallel tunnel contexts of the tunnel 120.

It is noted that the tunnel context identifier formats that are available for use in uniquely identifying the multiple parallel tunnel contexts of tunnel 120 may be defined and applied statically and/or dynamically. For example, a single tunnel context identifier format (configured to handle various parallel tunnel context scenarios) may be defined (e.g., with or without being standardized) and applied in various parallel tunnel context scenarios. For example, multiple tunnel context identifier formats (e.g., each configured to handle single or multiple parallel tunnel context scenarios) may be defined (e.g., with or without being standardized) and applied in various parallel tunnel context scenarios (e.g., statically applied in that the TSN 110-S is configured to always use one of the available tunnel context identifier formats due to the way in which the TSN 110-S is configured, dynamically applied in that the TSN 110-S can dynamically select one of the available tunnel context identifier formats for the tunnel 120 based on determination of the basis for the multiple parallel tunnel contexts for the tunnel 120, or the like). It is noted that the tunnel context identifier formats that are available for use in uniquely identifying the multiple parallel tunnel contexts of the tunnel 120 may be defined and applied statically or dynamically in various other ways.

The TNs 110 are configured to support tunnel-level fragmentation and reassembly of packets being transported via tunnel 120, in a manner that accounts for multiple packets associated with a given parallel tunnel context of the tunnel 120, based on unique identification of the packets associated with the given parallel tunnel context of the tunnel 120. This unique identification is communicated using the packet identifier of the packet context identifier, as discussed above. The packet identifier may be provided as a sequence number, a random number, or using any other value suitable for uniquely identifying packets transported using a given parallel tunnel context of the tunnel 120. The TNs 110, as noted above, are configured to support tunnel-level fragmentation and reassembly of packets being transported via tunnel 120 based on a reassembly tuple that includes a packet context identifier. As noted above, the packet context identifier is composed of (1) a tunnel context identifier providing unique identification of the tunnel context of the tunnel packet 140 and, thus, the tunnel context via which the packet 130 is transported) and (2) a packet identifier providing unique identification of the tunnel packet 140 within the tunnel context of the tunnel packet 140 (and, again, within the tunnel context via which the packet 130 is transported). As also noted above, the sizes of the tunnel context identifier and the packet identifier, and, thus, of the packet context identifier, may vary under various conditions. As discussed further below, this may or may not present a challenge to signaling of the reassembly context from the TSN 110-S to the TDN 110-D, depending on factors such as the size of the packet context identifier (including the distribution of the bits of the tunnel context identifier and the packet identifier within the packet context identifier), the protocol of the tunnel 120 (e.g., GRE, IP (e.g., IPv4 or IPv6), IPSec, or the like), or the like, as well as various combinations thereof. The TNs 110 may be configured to support signaling of the packet context identifier within the tunnel headers (e.g., tunnel headers 151) in various ways, some examples of which are provided for IPv4 and IPv6 (other protocols are omitted for purposes of clarity).

Figure 3:
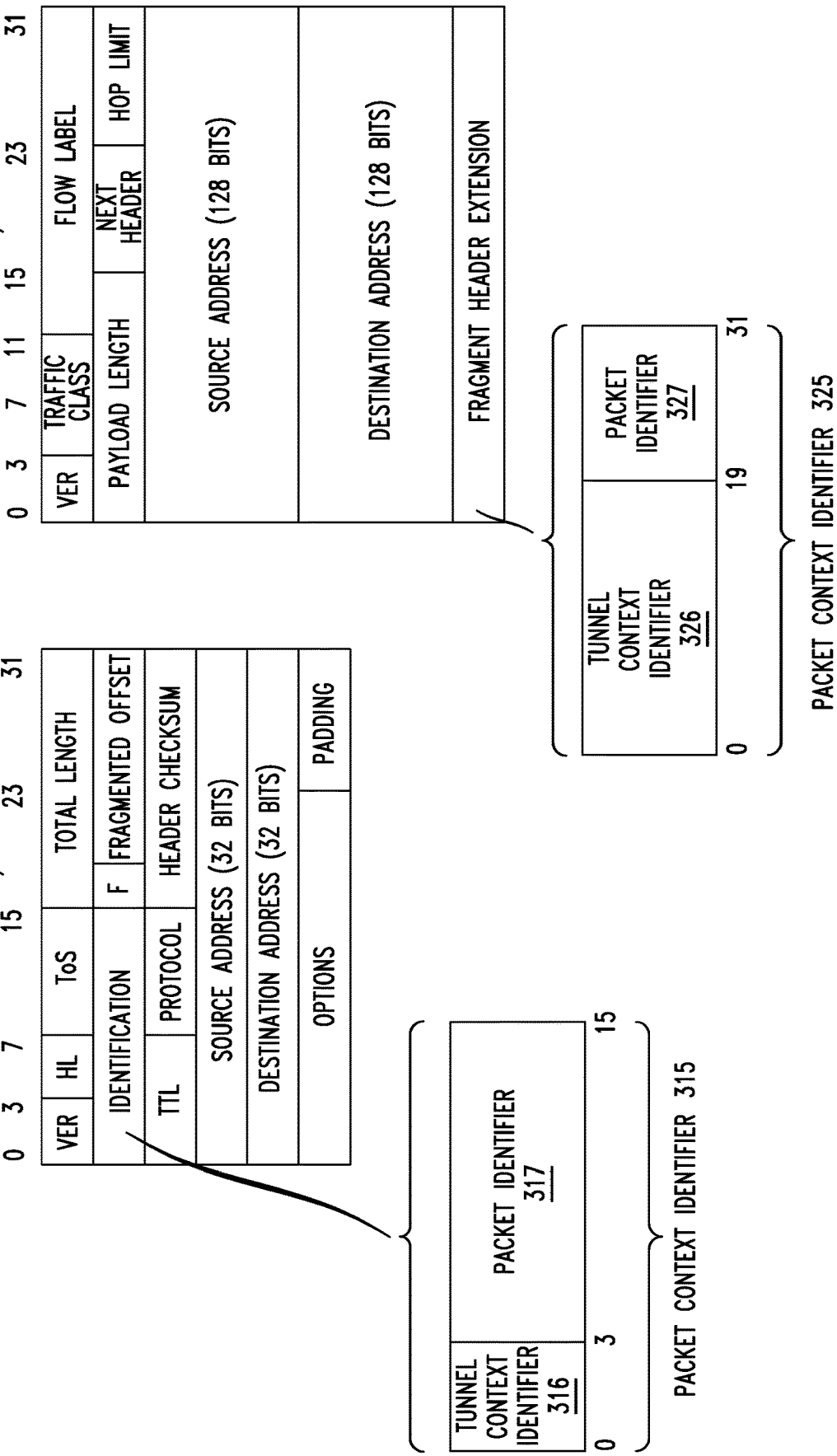
FIGS. 3A and 3B depict examples of header formats configured to transport packet context information for packets fragmented and reassembled on a tunnel between a tunnel source node and a tunnel destination node.

In IPv4, for example, the packet context identifier that is used to support tunnel-level fragmentation and reassembly may be transported in the tunnel header (e.g., tunnel headers 151) in various ways. An IPv4 header currently includes IP Source and Destination Address fields, a Protocol field, and a 16-bit Identification field. The tunnel source address and the tunnel destination address may be included in the IP Source and Destination Address fields, respectively. The protocol (e.g., GRE, ESP, or the like) may be included in the Protocol field. However, from the examples above, it will be appreciated that the 16-bit Identification field may or may not be sufficient for transporting the packet context identifier. For example, where load balancing mechanisms are not applied and the tunnel context identifier is a 4-bit tunnel context identifier that includes 4 bits for identifying the queue and the packet identifier of the packet is 12 bits, the packet context identifier will include a total of 16 bits and, thus, can fit in the 16-bit Identification field of the IPv4 header. An example of this is presented in FIG. 3A, which illustrates insertion of a 16-bit packet context identifier 315 (composed of a tunnel context identifier 316 and a packet identifier 317) into the 16-bit Identification field of an IPv4 header 310. By contrast, where a load balancing mechanism is used and the tunnel context identifier is a 20-bit tunnel context identifier (e.g., including 4 bits for identifying the line card number, 4 bits for identifying the port number, 4 bits for identifying the queue and 8 bits for identifying the network interface identifier) and the packet identifier of the packet is 12 bits, the packet context identifier will include a total of 32 bits and, thus, cannot fit in the 16-bit Identification field of the IPv4 header. It will be appreciated that there also may be other scenarios in which the packet context identifier is greater than the 16 bits allocated in the Identification field of the IPv4 header (e.g., use of a 4-bit tunnel context identifier and a 16-bit packet identifier, use of an 18-bit tunnel context identifier and an 8-bit packet identifier, or the like). In at least some embodiments, in which the packet context identifier is greater than the 16 bits allocated in the Identification field of the IPv4 header, a portion of the packet context identifier (e.g., the tunnel context identifier) may be included in the Identification Field and a remaining portion of packet context identifier (e.g., the packet identifier) may be inserted into the tunnel header using one or more other fields (e.g., using one or more IP Options fields, using one or more header extensions, or the like, as well as various combinations thereof). In at least some embodiments, for example, a new Identification Extension field (e.g., 24 bits, 32 bits, or the like) may be defined for transporting all or part of the packet context identifier. It will be appreciated that the various portions of packet context identifier (e.g., tunnel context identifier, packet identifier, or the like) may be inserted into the IPv4 header in various ways.

In IPv6, for example, the packet context identifier that is used to support tunnel-level fragmentation and reassembly may be transported in the tunnel header (e.g., tunnel headers 151) in various ways. An IPv6 header currently includes IP Source and Destination address fields, a Next-Header field (which may identify the protocol, such as GRE, ESP, or the like), and, when the fragment header extension is present, a 32-bit Identification field of the fragment header extension. The tunnel source address and the tunnel destination address may be included in the IP Source and Destination Address fields, respectively. The protocol may be included in the Next-Header field. From the examples above, it will be appreciated that, in many cases, the 32-bit Identification Field in the fragment header extension may be sufficient for transporting the packet context identifier. For example, where load balancing mechanisms are not applied and the tunnel context identifier is a 4-bit tunnel context identifier that includes 4 bits for identifying the queue and the packet identifier is 12 bits, the packet context identifier will include a total of 16 bits and, thus, can fit in the 32-bit Identification field of the fragment header extension. Similarly, for example, where a load balancing mechanism is used and the tunnel context identifier is a 20-bit context identifier (e.g., including 4 bits for identifying the line card number, 4 bits for identifying the port number, 4 bits for identifying the queue and 8 bits for identifying the network interface identifier) and the packet identifier is 12 bits, the packet context identifier will include a total of 32 bits and, thus, also can fit in the 32-bit Identification field of the fragment header extension. An example of this is presented in FIG. 3B, which illustrates insertion of a 32-bit packet context identifier 325 (composed of a tunnel context identifier 326 and a packet identifier 327) into the 32-bit Identification field of fragment header extension of an IPv6 header 320. By contrast, where a load balancing mechanism is used and the tunnel context identifier is a 20-bit tunnel context identifier (e.g., including 4 bits for identifying the line card number, 4 bits for identifying the port number, 4 bits for identifying the queue and 8 bits for identifying the network interface identifier) but the packet identifier is 16 bits, the packet context identifier will include a total of 36 bits and, thus, cannot fit in the 32-bit Identification field of the fragment header extension. It will be appreciated that there also may be other scenarios in which the packet context identifier is greater than the 32 bits allocated in the Identification field of the fragment header extension. In at least some embodiments, in which the packet context identifier is greater than the 32 bits allocated in the Identification field of the fragment header extension, a portion of the packet context identifier (e.g., the tunnel context identifier) may be included in the Identification field of the fragment header extension and a remaining portion of packet context identifier (e.g., the packet identifier) may be inserted into the tunnel header using one or more other fields (e.g., using the IPv6 Flow Label field, using one or more header extensions, or the like, as well as various combinations thereof). It will be appreciated that the various portions of packet context identifier (e.g., tunnel context identifier, packet identifier, or the like) may be inserted into the IPv6 header in various ways.

It will be appreciated that, for other tunneling protocols used for tunneling (e.g., GRE, IPSec, or the like), various elements (e.g., fields, options, extensions, or the like, as well as various combinations thereof) of headers of such other tunneling protocols may be used for transporting the packet context identifier.

The TNs 110, as noted above, are configured to support tunnel-level fragmentation and reassembly of packets being transported via tunnel 120 based on use of a tunnel context identifier to uniquely identify tunnel context.

The TSN 110-S is configured to support tunnel-level fragmentation of tunnel packets transported via the tunnel 120. The TSN 110-S receives or obtains the packet 130 that is to be transported via the tunnel 120 and puts the packet 130 into the tunnel as the tunnel packet 140. The TSN 110-S identifies a tunnel context of the tunnel 120 for the tunnel packet 140 which is indicative of a tunnel entry point into the tunnel 120 for the tunnel packet 140 (which, as discussed herein, may be based on various types of information which may be used to define tunnel contexts of the tunnel 120, such as a line card via which the tunnel packet 140 is to be sent, a port via which the tunnel packet 140 is to be sent, a queue via which the tunnel packet 140 is to be sent, a network interface via which the tunnel packet 140 is to be sent, a link of a LAG via which the tunnel packet 140 is to be sent, a path of an ECMP-based set of paths via which the tunnel packet 140 is to be sent, or the like, as well as various combinations thereof. The TSN 110-S determines that the tunnel packet 140 is to be fragmented (e.g., based on a comparison of the packet size of the tunnel packet 140 and an associated MTU size or based on any other suitable basis for fragmenting the tunnel packet 140). The TSN 110-S determines a unique packet context identifier of the tunnel packet 140 on the tunnel 120, which includes (1) a tunnel context identifier indicative of the tunnel context of the tunnel 120 for the tunnel packet 140 (and, thus, for its associated tunnel packet fragments which are put into the tunnel payloads 152) and (2) a packet identifier (e.g., sequence number, random number, or other suitable value) configured to identify the tunnel packet 140 being fragmented on that tunnel context of the tunnel 120 (so as to distinguish this tunnel packet 140 from other tunnel packets fragmented on the same tunnel context of the tunnel 120). The TSN 110-S obtains the tunnel context identifier associated with the tunnel context of the tunnel packet 140 (which also may be referred to herein as a unique tunnel entry point identifier). The TSN 110-S obtains the tunnel context identifier associated with the tunnel context of the tunnel packet 140 based on identification of the tunnel context (or tunnel entry point into the tunnel 120) for the tunnel packet 140. The TSN 110-S may obtain the tunnel context identifier associated with the tunnel context of the tunnel packet 140 by generating the tunnel context identifier (e.g., based on information indicative of identifiers of the elements of the tunnel context of the tunnel packet 140, by performing a lookup where the tunnel context identifiers of the tunnel contexts of the tunnel 120 are predetermined, or the like). The TSN 110-S obtains the packet identifier of the tunnel packet 140 (e.g., by incrementing a sequence number or using any other identifier for uniquely identifying the tunnel packet 140 on the tunnel context being used to transport the tunnel packet 140). The TSN 110-S fragments the tunnel packet 140 to create the two tunnel fragment packets 150. The fragments of the tunnel payload 142 of the tunnel packet 140 become the tunnel payloads 152 of the tunnel fragment packets 150. The TSN 110-S generates the tunnel headers 151 for the tunnel fragment packets 150. The tunnel headers 151 for the tunnel fragment packets 150 include reassembly tuples which are configured to uniquely identify the reassembly context of the tunnel packet 140 that is being fragmented (e.g., based on a combination of the source address, destination address, protocol, and the packet context identifier including the tunnel context identifier and the packet identifier). It is noted that the TSN 110-S may (1) insert the packet context identifier within the tunnel header 141 of the tunnel packet 140 such that the packet context identifier is inserted into the packet headers 151 of the tunnel fragment packets 150 based on generation of the packet headers 151 of the tunnel fragment packets 150 from the tunnel header 141 of the tunnel packet 140 or (2) insert the packet context identifier within the tunnel headers 151 of the tunnel fragment packets 150 directly (e.g., without inserting the packet context identifier within the tunnel header 141 of the tunnel packet 140). The TSN 110-S adds the tunnel header 151 to the tunnel payloads 152 to form thereby the tunnel fragment packets 150 to be sent over the tunnel 120.

The TSN 110-S sends the tunnel fragment packets 150 routed toward the TDN 110-D via the tunnel content of the tunnel 120.

The TDN 110-D is configured to support tunnel-level reassembly of tunnel packets transported via the tunnel 120. The TDN 110-D receives the tunnel fragment packets 150 via the tunnel 120. The TDN 110-D determines that the TDN 110-D is the tunnel destination endpoint for the tunnel fragment packets 150. The TDN 110-D determines that the tunnel fragment packets 150 are associated with the tunnel packet 140 to be reassembled. The TDN 110-D determines that the tunnel fragment packets 150 are associated with the tunnel packet to be reassembled based on the reassembly tuple included in the tunnel headers 151 of the tunnel fragment packets 150 (e.g., based on a determination that the reassembly tuples of the tunnel fragment packets 150 match). For example, the TDN 110-D may determine that the tunnel fragment packets 150 are associated with the tunnel packet 140 to be reassembled based on a combination of the source address, the destination address, the protocol, and the packet context identifier including the tunnel context identifier and the packet identifier. The TDN 110-D determines a reassembly order for the tunnel fragment packets 150 that are associated with the tunnel packet 140 to be reassembled. The TDN 110-D reassembles the tunnel packet 140 from the tunnel fragment packets 150 based on the reassembly order for the tunnel fragment packets 150. The TDN 110-D removes the tunnel headers 151 from the tunnel fragment packets 150 to recover the tunnel payloads 152 of the tunnel fragment packets 150 (which are transporting the two tunnel packet fragments of the tunnel payload 142 of the tunnel packet 140). The TDN 110-D reassembles the tunnel payload 142 of the tunnel packet 140 from the two tunnel packet fragments of the tunnel payloads 152. The TDN 110-D determines the tunnel header 141 of the tunnel packet 140 from the tunnel headers 151 of the tunnel fragment packets. The TDN 110-D reassembles the tunnel packet 140 from the tunnel payload 142 and the tunnel header 141. The TDN 110-D removes the tunnel header 141 (and, if present, the protocol header 143) from the reassembled tunnel packet 140 to recover thereby the packet 130. The TDN 110-D may then process the recovered packet 130 (e.g., where the TDN 110-D is the intended destination of the recovered packet 130) or may further propagate the recovered packet 130 (e.g., where the TDN 110-D is not the intended destination of the recovered packet 130).

It will be appreciated that, although primarily presented herein with respect to performing fragmentation and reassembly of tunnel packets within the tunnel 120, fragmentation and reassembly may not be performed for all tunnel packets within the tunnel 120. In the case in which the tunnel packet 140 is fragmented at TSN 110-S, the packet context identifier is set to an appropriate value and the permission of downstream devices to further fragment may be set as desired (e.g., using a Do Not Fragment (DF) bit of the IPv4 header, such as by setting the DF bit to "1" if downstream fragmentation is not permitted or setting the DF bit to "0" if downstream fragmentation is permitted). In the case in which the tunnel packet 140 is not fragmented at the TSN 110-S, the packet context identifier is set to an appropriate value depending on whether downstream fragmentation is not permitted (e.g., if the DF bit is set to "1" then the packet context identifier is set to a default value (e.g., "0")) or whether downstream fragmentation is permitted (e.g., if the DF bit is set to "0" then the packet context identifier is set to an identification value).

The TNs 110 may be configured in various ways to support tunnel-level fragmentation and reassembly of packets being transported via tunnel 120. As illustrated in FIG. 1, for example, the TSN 110-S includes a packet fragmentation element (PFE) 111-S configured to support tunnel-level fragmentation of packets being transported via the tunnel 120 and the TDN 110-D includes a packet reassembly element (PRE) 111-D configured to support tunnel-level reassembly of fragmented packets being transported via the tunnel 120. It will be appreciated that the PFE 111-S and the PRE 111-D may be implemented on the TSN 110-S and the TDN 110-D, respectively, in a centralized or distributed manner.

The TNs 110 may be configured to provide various other functions for supporting the tunnel-level fragmentation and reassembly of packets being transported via tunnel 120.

Figure 4:
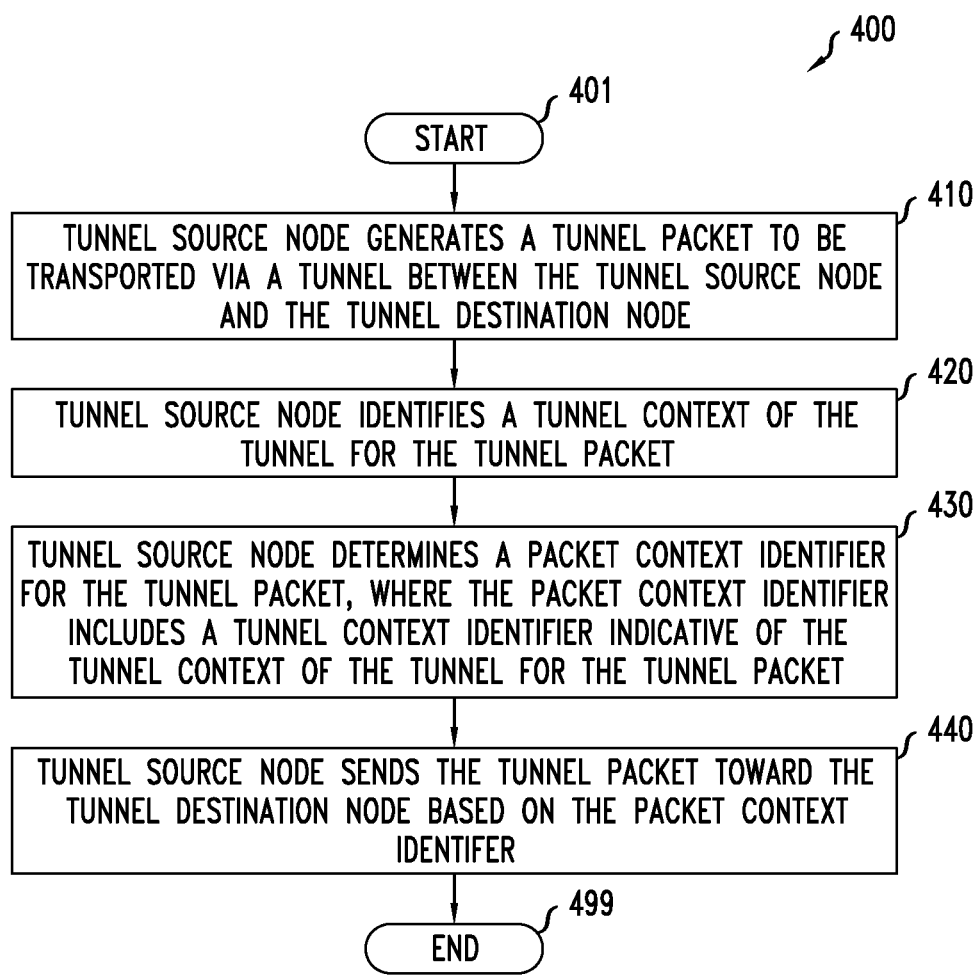
FIG. 4 depicts an embodiment of a method for performing tunnel-level fragmentation of a tunnel packet at a tunnel source node.

FIG. 4 depicts an embodiment of a method for performing tunnel-level fragmentation of a tunnel packet at a tunnel source node. It will be appreciated that the functions of method 400, although presented in FIG. 4 as being performed serially, may be performed contemporaneously or in a different order than as presented in FIG. 4. At block 401, method 400 begins. At block 410, the tunnel source node generates a tunnel packet to be transported via a tunnel between the tunnel source node and the tunnel destination node. At block 420, the tunnel source node identifies a tunnel context of the tunnel for the tunnel packet. At block 430, the tunnel source node determines a packet context identifier for the tunnel packet, where the packet context identifier includes a tunnel context identifier indicative of the tunnel context of the tunnel for the tunnel packet. At block 440, the tunnel source node sends the tunnel packet toward the tunnel destination node based on the packet context identifier. At block 499, method 400 ends.

Figure 5:
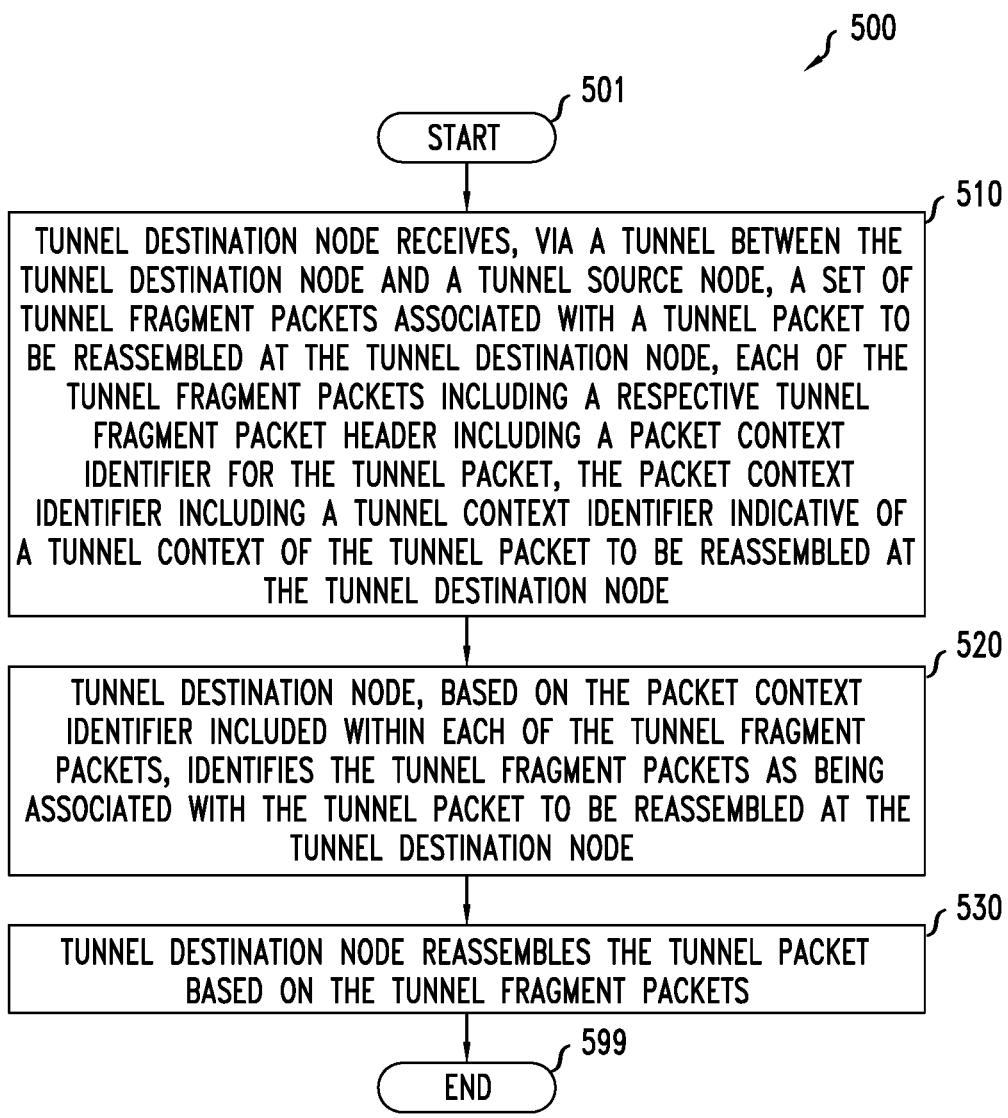
FIG. 5 depicts an embodiment of a method for performing tunnel-level reassembly of a tunnel packet at a tunnel destination node.

FIG. 5 depicts an embodiment of a method for performing tunnel-level reassembly of a tunnel packet at a tunnel destination node. It will be appreciated that the functions of method 500, although presented in FIG. 5 as being performed serially, may be performed contemporaneously or in a different order than as presented in FIG. 5. At block 501, method 500 begins. At block 510, the tunnel destination node receives, via a tunnel between the tunnel destination node and a tunnel source node, a set of tunnel fragment packets associated with a tunnel packet to be reassembled at the tunnel destination node, each of the tunnel fragment packets including a respective tunnel fragment packet header including a packet context identifier for the tunnel packet, the packet context identifier including a tunnel context identifier indicative of a tunnel context of the tunnel packet to be reassembled at the tunnel destination node. At block 520, the tunnel destination node, based on the packet context identifier included within each of the tunnel fragment packets, identifies the tunnel fragment packets as being associated with the tunnel packet to be reassembled at the tunnel destination node. At block 530, the tunnel destination node reassembles the tunnel packet based on the tunnel fragment packets. At block 599, method 500 ends.

It will be appreciated that various embodiments of the tunnel fragmentation and reassembly capability may provide various advantages or potential advantages. For example, various embodiment of the tunnel fragmentation and reassembly capability may be configured to support tunnel-level fragmentation and reassembly of packets of a tunnel in a manner tending to prevent reassembly errors, that could cause malformed packets or packet drops at the tunnel destination nodes, due to multiple parallel tunnel contexts of the tunnel which may correspond to multiple parallel entry points into the tunnel at the tunnel source node. It will be appreciated that various embodiments of the tunnel fragmentation and reassembly capability may provide various other advantages or potential advantages.

Figure 6:
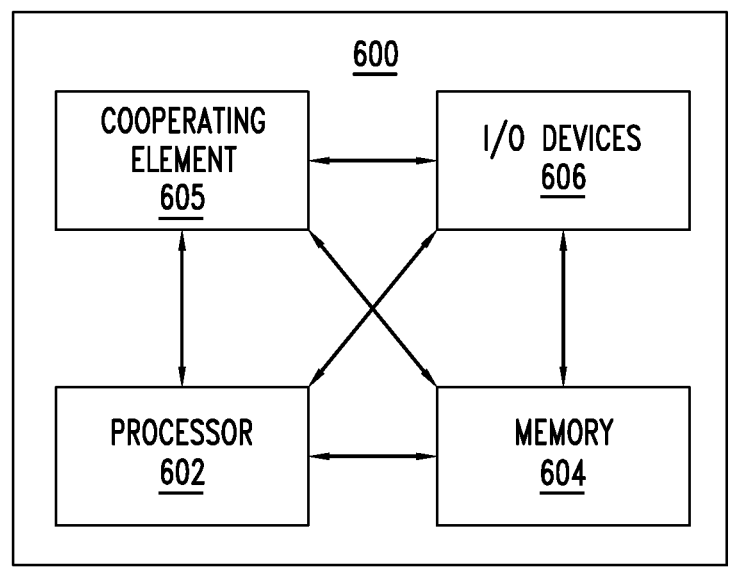
FIG. 6 depicts a high-level block diagram of a computer suitable for use in performing various functions presented herein.

FIG. 6 depicts a high-level block diagram of a computer suitable for use in performing various functions described herein.

The computer 600 includes a processor 602 (e.g., a central processing unit (CPU), a processor having a set of processor cores, or the like) and a memory 604 (e.g., a random access memory (RAM), a read only memory (ROM), or the like). The processor 602 and the memory 604 are communicatively connected such that information from the memory 604 (e.g., instructions, data, or the like, as well as various combinations thereof) may be processed by the processor 602.

The computer 600 also may include a cooperating element 605. The cooperating element 605 may be a hardware device. The cooperating element 605 may be a process that can be loaded into the memory 604 and executed by the processor 602 to implement functions as discussed herein (in which case, for example, the cooperating element 605 (including associated data structures) can be stored on a non-transitory computer-readable storage medium, such as a storage device or other storage element (e.g., a magnetic drive, an optical drive, or the like)).

The computer 600 also may include one or more input/output devices 606. The input/output devices 606 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 of FIG. 6 may represent a general architecture and functionality suitable for implementing functional elements described herein, portions of functional elements described herein, or the like, as well as various combinations thereof. For example, computer 600 may provide a general architecture and functionality that is suitable for implementing one or more of TSN 110-S or a portion thereof, TDN 110-D or a portion thereof, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing a set of instructions;
   wherein the set of instructions is configured to, when executed by the at least one processor, cause the apparatus to:
      generate, by a first node, a tunnel packet to be transported via a tunnel between the first node and a second node;
      identify, by the first node, a tunnel context of the tunnel for the tunnel packet;
      determine, by the first node, a packet context identifier for the tunnel packet, the packet context identifier including a tunnel context identifier indicative of the tunnel context of the tunnel for the tunnel packet and a packet identifier configured to uniquely identify the tunnel packet within the tunnel context of the tunnel for the tunnel packet, wherein the tunnel context identifier includes a set of bits identifying a queue of the first node via which the tunnel packet is to be sent; and
      send the tunnel packet from the first node toward the second node based on the packet context identifier.

2. The apparatus of claim 1, wherein the tunnel packet comprises a tunnel header and a tunnel payload, wherein the tunnel payload comprises a packet obtained at the first node and protocol header information.

3. The apparatus of claim 1, wherein the tunnel context of the tunnel for the tunnel packet is indicative of a tunnel entry point into the tunnel for the tunnel packet at the first node.

4. The apparatus of claim 1, wherein the tunnel context of the tunnel for the tunnel packet is identified from a set of multiple parallel tunnel contexts providing, respectively, multiple tunnel entry points for the tunnel packet at the first node.

5. The apparatus of claim 1, wherein the packet identifier comprises a sequence number or a random number.

6. The apparatus of claim 1, wherein, to send the tunnel packet from the first node toward the second node based on the packet context identifier, the set of instructions is configured to cause the apparatus to:
   fragment, by the first node, the tunnel packet to form a set of tunnel fragment packets for the tunnel packet, the tunnel fragment packets including respective tunnel fragment packet payloads including respective portions of a tunnel payload of the tunnel packet, the tunnel fragment packets including respective tunnel fragment packet headers including the packet context identifier for the tunnel packet; and
   send the tunnel fragment packets from the first node toward the second node via the tunnel context of the tunnel for the tunnel packet.

7. The apparatus of claim 6, wherein the tunnel fragment packet headers comprise Generic Routing Encapsulation (GRE) headers, Internet Protocol version 4 (IPv4) headers, IP version 6 (IPv6) headers, or IP Security (IPSec) headers.

8. The apparatus of claim 6, wherein the tunnel fragment packet headers comprise respective reassembly context tuples including:
   a source address field including an address of the first node;
   a destination address field including an address of the second node;
   a protocol field identifying a protocol of the tunnel packet; and
   the packet context identifier for the tunnel packet.

9. The apparatus of claim 6, wherein the tunnel fragment packet headers comprise Internet Protocol version 4 (IPv4) headers.

10. The apparatus of claim 9, wherein, for each of the tunnel fragment packet headers, the packet context identifier is included within an Identification Field of the IPv4 header.

11. The apparatus of claim 9, wherein, for each of the tunnel fragment packet headers, a first portion of the packet context identifier is included within an Identification Field of the IPv4 header and a second portion of the packet context identifier is included within at least one of an options field or a header extension of the IPv4 header.

12. The apparatus of claim 6, wherein the tunnel fragment packet headers comprise Internet Protocol version 6 (IPv6) headers.

13. The apparatus of claim 12, wherein, for each of the tunnel fragment packet headers, the packet context identifier is included within an Identification field of a fragment header extension of the IPv6 header.

14. The apparatus of claim 12, wherein, for each of the tunnel fragment packet headers, a first portion of the packet context identifier is included within an Identification field of a fragment header extension of the IPv6 header and a second portion of the packet context identifier is included within a Flow Label field of the IPv6 header or an extension header of the IPv6 header.

15. The apparatus of claim 1, wherein, to send the tunnel packet from the first node toward the second node based on the packet context identifier, the set of instructions is configured to cause the apparatus to:
   modify a tunnel header of the tunnel packet by inserting within the tunnel header the packet context identifier for the tunnel packet and an indication that downstream fragmentation of the tunnel packet is permitted; and
   send the tunnel packet from the first node toward the second node via the tunnel context of the tunnel for the tunnel packet.

16. The apparatus of claim 1, wherein the packet context identifier is included within an Identification Field of an IPv4 header.

17. The apparatus of claim 1, wherein a first portion of the packet context identifier is included within an Identification Field of an IPv4 header and a second portion of the packet context identifier is included within at least one of an options field or a header extension of the IPv4 header.

18. The apparatus of claim 1, wherein the packet context identifier is included within an Identification field of a fragment header extension of an IPv6 header.

19. The apparatus of claim 1, wherein a first portion of the packet context identifier is included within an Identification field of a fragment header extension of an IPv6 header and a second portion of the packet context identifier is included within a Flow Label field of the IPv6 header or an extension header of the IPv6 header.

20. The apparatus of claim 1, wherein the tunnel context of the tunnel for the tunnel packet is based on:
- a line card of the first node via which the tunnel packet is to be sent;
- a port of the first node via which the tunnel packet is to be sent; and
- the queue of the first node via which the tunnel packet is to be sent.

21. The apparatus of claim 20, wherein the tunnel context identifier includes:
- a set of bits identifying the line card of the first node via which the tunnel packet is to be sent; and
- a set of bits identifying the port of the first node via which the tunnel packet is to be sent.

22. The apparatus of claim 21, wherein the set of bits identifying the line card of the first node via which the tunnel packet is to be sent includes four bits, set of bits identifying the port of the first node via which the tunnel packet is to be sent includes four bits, and the set of bits identifying the queue of the first node via which the tunnel packet is to be sent includes four bits.

23. The apparatus of claim 1, wherein the tunnel context of the tunnel for the tunnel packet is based on:
- a line card of the first node via which the tunnel packet is to be sent;
- a port of the first node via which the tunnel packet is to be sent;
- the queue of the first node via which the tunnel packet is to be sent; and
- a network interface of the first node via which the tunnel packet is to be sent.

24. The apparatus of claim 23, wherein the tunnel context identifier includes:
- a set of bits identifying the line card of the first node via which the tunnel packet is to be sent;
- a set of bits identifying the port of the first node via which the tunnel packet is to be sent; and
- a set of bits identifying the network interface of the first node via which the tunnel packet is to be sent.

25. The apparatus of claim 24, wherein the set of bits identifying the line card of the first node via which the tunnel packet is to be sent includes four bits, set of bits identifying the port of the first node via which the tunnel packet is to be sent includes four bits, the set of bits identifying the queue of the first node via which the tunnel packet is to be sent includes four bits, and the set of bits identifying the network interface of the first node via which the tunnel packet is to be sent includes at least six bits.

26. A method, comprising:
- generating, by a first node, a tunnel packet to be transported via a tunnel between the first node and a second node;
- identifying, by the first node, a tunnel context of the tunnel for the tunnel packet;
- determining, by the first node, a packet context identifier for the tunnel packet, the packet context identifier including a tunnel context identifier indicative of the tunnel context of the tunnel for the tunnel packet and a packet identifier configured to uniquely identify the tunnel packet within the tunnel context of the tunnel for the tunnel packet, wherein the tunnel context identifier includes a set of bits identifying a queue of the first node via which the tunnel packet is to be sent; and
- sending the tunnel packet from the first node toward the second node based on the packet context identifier.

* * * * *